United States Patent
Quartarone et al.

(10) Patent No.: US 11,577,841 B2
(45) Date of Patent: Feb. 14, 2023

(54) ENVIRONMENTAL CONTROL SYSTEM

(71) Applicant: Hamilton Sundstrand Corporation, Charlotte, NC (US)

(72) Inventors: Giusi Quartarone, Mayfield (IE); Catherine Thibaud, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 463 days.

(21) Appl. No.: 16/718,253

(22) Filed: Dec. 18, 2019

(65) Prior Publication Data
US 2021/0107662 A1 Apr. 15, 2021

(30) Foreign Application Priority Data
Oct. 14, 2019 (EP) ..................................... 19202986

(51) Int. Cl.
*B64D 13/06* (2006.01)

(52) U.S. Cl.
CPC ........ *B64D 13/06* (2013.01); *B64D 2013/064* (2013.01); *B64D 2013/0611* (2013.01); *B64D 2013/0618* (2013.01); *B64D 2013/0651* (2013.01); *B64D 2013/0655* (2013.01); *B64D 2013/0688* (2013.01)

(58) Field of Classification Search
CPC .... B64D 2013/0603; B64D 2013/0625; B64D 2013/06; B64D 2013/51; B64D 2013/0655; B64D 2013/0688
See application file for complete search history.

(56) References Cited

U.S. PATENT DOCUMENTS

| | | | |
|---|---|---|---|
| 5,145,124 A | 9/1992 | Brunskill et al. | |
| 5,516,330 A | 5/1996 | Dechow et al. | |
| 5,791,982 A | 8/1998 | Curry et al. | |
| 7,778,735 B2 | 8/2010 | Gray | |
| 9,827,825 B2 | 11/2017 | Kwark | |
| 9,889,939 B2 * | 2/2018 | Zhang | B64D 13/08 |
| 9,896,216 B2 * | 2/2018 | Linert | B64D 13/06 |
| 9,908,386 B2 | 3/2018 | Trutnovsky et al. | |
| 2006/0284839 A1 * | 12/2006 | Breed | B62D 1/046 345/156 |

(Continued)

FOREIGN PATENT DOCUMENTS

| | | |
|---|---|---|
| CN | 106545950 A | 3/2017 |
| JP | 2010173454 A | 8/2010 |
| JP | 2012066755 A * | 4/2012 |

OTHER PUBLICATIONS

European Search Report for Application No. 19202986.6, dated Apr. 14, 2020, 47 pages.

*Primary Examiner* — Todd E Manahan
*Assistant Examiner* — Thuyhang N Nguyen
(74) *Attorney, Agent, or Firm* — Cantor Colburn LLP

(57) ABSTRACT

A method and system for controlling fresh air flow into a controlled environment are disclosed herein. The method comprises: measuring, using a sensor, a predetermined property in the controlled environment; estimating, by a controller, a number of people inside the controlled environment based on the measured property, and setting, by the controller, a rate of fresh air flow to the controlled environment based at least in part on the estimated number of people inside the controlled environment.

15 Claims, 2 Drawing Sheets

(56) References Cited

U.S. PATENT DOCUMENTS

| | | | |
|---|---|---|---|
| 2008/0283663 A1* | 11/2008 | Space | B64D 13/06 244/118.5 |
| 2016/0214723 A1* | 7/2016 | Fox | B64D 13/06 |
| 2017/0247112 A1* | 8/2017 | Horner | B64D 13/04 |
| 2018/0004178 A1 | 1/2018 | Haines et al. | |
| 2018/0065752 A1* | 3/2018 | Franco | B64D 13/06 |
| 2019/0264940 A1 | 8/2019 | Lee et al. | |

* cited by examiner

ENVIRONMENTAL CONTROL SYSTEM

FOREIGN PRIORITY

This application claims priority to European Patent Application No. 19202986.6 filed Oct. 14, 2019, the entire contents of which is incorporated herein by reference.

TECHNICAL FIELD

The present disclosure relates to a method and system for controlling fresh air flow into a controlled environment. The controlled environment may, for example, be an aircraft cabin.

BACKGROUND

Environmental control systems (ECSs) are for controlling the air environments in enclosed spaces, such as in vehicles. In particular, the systems and methods described herein may be used in vehicles such as aircraft, spacecraft, submarines, or any other vehicle wherein humans or animals may be present within the enclosed space so that some control of its internal environment is required.

Known ECSs, that provide conditioned air to occupants in an aircraft cabin, are the most energy demanding among all the aircraft sub-systems. A bleed ECS consumes up to 75% of the non-propulsive power during cruise conditions, and up to 5% of the total power produced by the engines. This energy is mainly used to compress the outside air to a suitable pressure for the cabin environment. Today, ECSs rely on a prescribed fresh air flow (FAF) per passenger (0.25 kg air/min per FAA regulations) to dilute contaminants generated within the aircraft cabin, to provide adequate oxygen, and to maintain cabin pressurization. FAF is usually calculated assuming a full load of passengers on the aircraft. As the fuel consumption of the ECS is largely related to its delivery air flow, the ability for the system to automatically determine the minimum total required air flow is important to achieve optimal energy consumption of the aircraft. Although other methods exist to evaluate the number of passengers, the ability for the system to independently and automatically determine it is attractive from a complexity viewpoint.

SUMMARY

According to a first aspect, the disclosure provides a method of controlling fresh air flow into a controlled environment, the method comprising: measuring, using a sensor, a predetermined property in the controlled environment; estimating, by a controller, a number of people inside the controlled environment based on the measured property, and setting, by the controller, a rate of fresh air flow to the controlled environment based at least in part on the estimated number of people inside the controlled environment.

The predetermined property may encompass any property that is directly or indirectly related to the number of people inside the controlled environment. For example, the sensor may detect a property of air inside the controlled environment, such as temperature, humidity, CO2 levels, etc. As humans give off heat, humidity and CO2, data relating to one of these properties may be used by the controller to estimate a number of people in the controlled environment. More than one sensor may be used to improve the accuracy of the estimation or to provide redundancy in case of sensor error or sensor failure. More than one predetermined property may be used in the step of estimating the number of people.

The step of measuring a predetermined property may comprise measuring an environmental property of the air in the controlled environment.

The step of measuring an environmental property in the controlled environment may comprise measuring a temperature, a carbon dioxide level, or a humidity level inside the controlled environment.

The step of measuring an environmental property in the controlled region may comprise measuring a rate of change of a temperature, a rate of change of a carbon dioxide level, or a rate of change of a humidity level inside the controlled environment.

The sensor may be configured to detect at least one of: energy consumption in the controlled environment, light levels in the controlled environment, movement of people within the controlled environment, pressure in at least a plurality of seats in the controlled environment, a sound level within the controlled environment, or the sensor may be a camera. Additionally, personal and wearable devices, such as phones and smart watches may be used to estimate the number of passengers. For example, this can be performed by detecting the number of devices that are connected to the aircraft network or that are running a specific app.

Pressure sensors in the seats may determine whether a given seat is occupied and by summing the number of pressure sensors indicating whether a person is sitting in the seat, the controller may estimate the number of passengers. Alternatively or additionally, a heartbeat sensor may detect the heartbeat of an occupant in the seat.

Light may be generated not only by lights in the controlled environment but also by handheld/personal devices (phones, laptops, tablets etc.) and any entertainment system in the controlled environment. Determining use of these devices through measuring light levels may indicate the number of people in the controlled environment.

The controlled environment may be an aircraft cabin. In other examples, the controlled environment may be in an aircraft, a spacecraft, a submarine, or any other vehicle with an enclosed controlled environment.

The method may make use of a plurality of sensors wherein each sensor is configured to sense a different property in the controlled environment. The method may then comprise: measuring, using each of the plurality of sensors, a respective property in the controlled environment; estimating a single number for the number of people inside the controlled environment based on combining estimates of the number of people inside the controlled environment derived from each of the plurality of measured properties; and setting the rate of fresh air flow based at least in part on the single number.

Using multiple different sensed properties can increase the accuracy of the estimation of the number of people inside the controlled environment. Further, in the case of an aircraft, different properties of the controlled environment may be more accurate than others at different stages of flight.

The controlled environment may be an aircraft cabin, and the step of measuring a predetermined property of the controlled environment may then performed between take-off and cruise of the aircraft. The method may include using an aircraft ECS for controlling the fresh air flow into the controlled environment, and this may include using a system as described below.

Between take-off and cruise, all passengers on an aircraft are seated and most will usually be awake. The average CO2 production rates for humans awake and at-rest may be looked up or measured in controlled circumstances (e.g. in a lab). Therefore, the CO2 production in the controlled environment (i.e. aircraft cabin) will be, within error, a multiple of the average CO2 production of a human at rest. The multiplier will be the estimated number of passengers aboard the aircraft (or within a given zone of the aircraft).

Probabilistic graphical models, steady state CO2 concentrations, theoretical CO2 mass balance, neural networks or hidden Markov models are examples of suitable mathematical models for converting the sensor data into an estimated number of people in the controlled environment.

The controlled environment may be divided into a plurality of zones and the method may further comprise: estimating, by the controller, the number of people in each zone of the controlled environment based on the or each measured property, and setting, by the controller, a proper ratio of fresh and recirculated air flow to each zone of the controlled environment based at least in part on the estimated number of people inside that zone of the controlled environment.

The airflow through the controlled environment may be a mixture of the Fresh Air Flow and recirculated air. Airflow to different zones of the controlled environment may be controlled by one or more valves and/or fans.

The method may also comprise the controller setting the speed of one or more fans to provide air, that is a mixture of recirculated air and fresh air flow, to the controlled environment. In one example, the air may be provided at different rates to different zones of the controlled environment by controlling the fan speed.

According to a second aspect, there is provided a system for controlling fresh air flow into a controlled environment, the system comprising: a controller configured to control a valve for allowing fresh air into the controlled environment; and at least one sensor for detecting a predetermined property inside the controlled environment, wherein the controller is connected to the at least one sensor and is configured to: determine a predetermined property inside the controlled environment; estimate a number of people inside the controlled environment based on the determined level, and to control the valve to allow a given flow of fresh air into the controlled environment wherein the amount of flow is based at least in part on the estimated number of people inside the controlled environment.

The system may be considered to be part of an adaptive environmental conditioning system (aECS), such as an aircraft aECS, that can modify to a greater extent the rate of Fresh Air Flow to the controlled environment. A standard environmental conditioning system has a limited capability of modifying the Fresh Air Flow. An adaptive environmental conditioning system may optionally further include other sensors, filters, fans, and may be configured to manage the operation of these components, e.g. to minimise energy use of the overall adaptive environmental conditioning system.

The controlled environment may be divided into a plurality of zones and the controller may be configured to: estimate the number of people in each zone of the controlled environment based on the or each measured property, and to set, by the controller, a rate of air flow to each zone of the controlled environment based at least in part on the estimated number of people inside that zone of the controlled environment.

The controller may be configured to control a fan speed of one or more fans. The one or more fans may be used to at least partially control the airflow to the controlled environment or to each zone of the controlled environment.

The sensor may be configured to measure an environmental property in the controlled environment, wherein the environmental property is one of temperature, carbon dioxide, or humidity.

The controller may be configured to determine a rate of change of the environmental property, and to estimate the number of people inside the controlled environment based on the rate of change of the environmental property.

A rapid increase in the rate of change of the environmental property may indicate that more FAF is required. This may also indicate that a previous estimation of the number of passengers was too low and the estimated number may be re-determined.

The sensor may be one of: an energy consumption sensor detecting electrical energy consumption in the controlled environment, a light sensor for detecting levels in the controlled environment, a movement sensor for detecting movement of people within the controlled environment, a pressure sensor for detecting pressure in a seat in the controlled environment, a microphone for detecting a sound level in the controlled environment, or a camera for detecting a number of people in the controlled environment or a microprocessor detecting personal devices connected to a network. Personal and wearable devices may be also used to estimate the number of passengers by detecting, for example, the number of devices that are connected to the network or that are using a specific app.

Electrical energy consumption may be the energy consumption of an entertainment system on an aircraft. Thus, detecting how many entertainment systems are active may indicate the number of passengers as only the entertainment system in occupied seats will be in use.

Pressure sensors may be installed in each seat of an aircraft. When a passenger is sat in a seat, the pressure sensor may detect this and provide the information to the controller. The controller may thus estimate the number of people by the number of pressure sensors indicating that a person is sitting there. During take-off to cruise of an aircraft, typically all passengers are seated and so this method may be most accurate at that stage of flight.

A camera may be configured to identify whether a given seat on an aircraft is occupied, e.g. by comparing current camera images with images of an empty aircraft, and thereby be used to estimate the number of people inside the controlled environment.

The system may comprise a plurality of different sensors each configured to detect a different predetermined property of the controlled environment. The controller may then be configured to: determine, using data received from each of the plurality sensors, a respective property in the controlled environment; estimate a single number for the number of people inside the controlled environment based on combining estimates of the number of people inside the controlled environment derived from each of the plurality of measured properties; and set the rate of fresh air flow based at least in part on the single number.

Using different data types may increase the accuracy of the overall estimation of the number of people in the controlled environment. Different data types may have different errors associated with the respective sensor. Further, different data types may be more accurately determined at different times of day or, in the case of aircraft, different stages of flight. Therefore, combining different data types may reduce the overall error in the estimation of the number of people in the controlled environment.

The sensor may be connected to the controller via a wireless connection. That is, the sensor does not need to have a wired connection to the controller.

According to a third aspect, there is provided an aircraft comprising: a valve for controlling fresh air flow to a cabin of the aircraft; and the system of the second aspect; wherein the at least one sensor is located in the aircraft cabin. The system may be incorporated into a broader environmental control system of the aircraft, such as an adaptive environmental conditioning system (aECS) thereof. Optionally, the fresh air flow may come from an engine of the aircraft (e.g. bleed air flow), an electric compressor of the aircraft, an Auxiliary Power Unit of the aircraft or a ground air supply connected to the aircraft.

BRIEF DESCRIPTION OF THE FIGURES

Certain embodiments of the present disclosure will now be described in greater detail by way of example only and with reference to the accompanying drawings in which.

DETAILED DESCRIPTION

Figure 1:
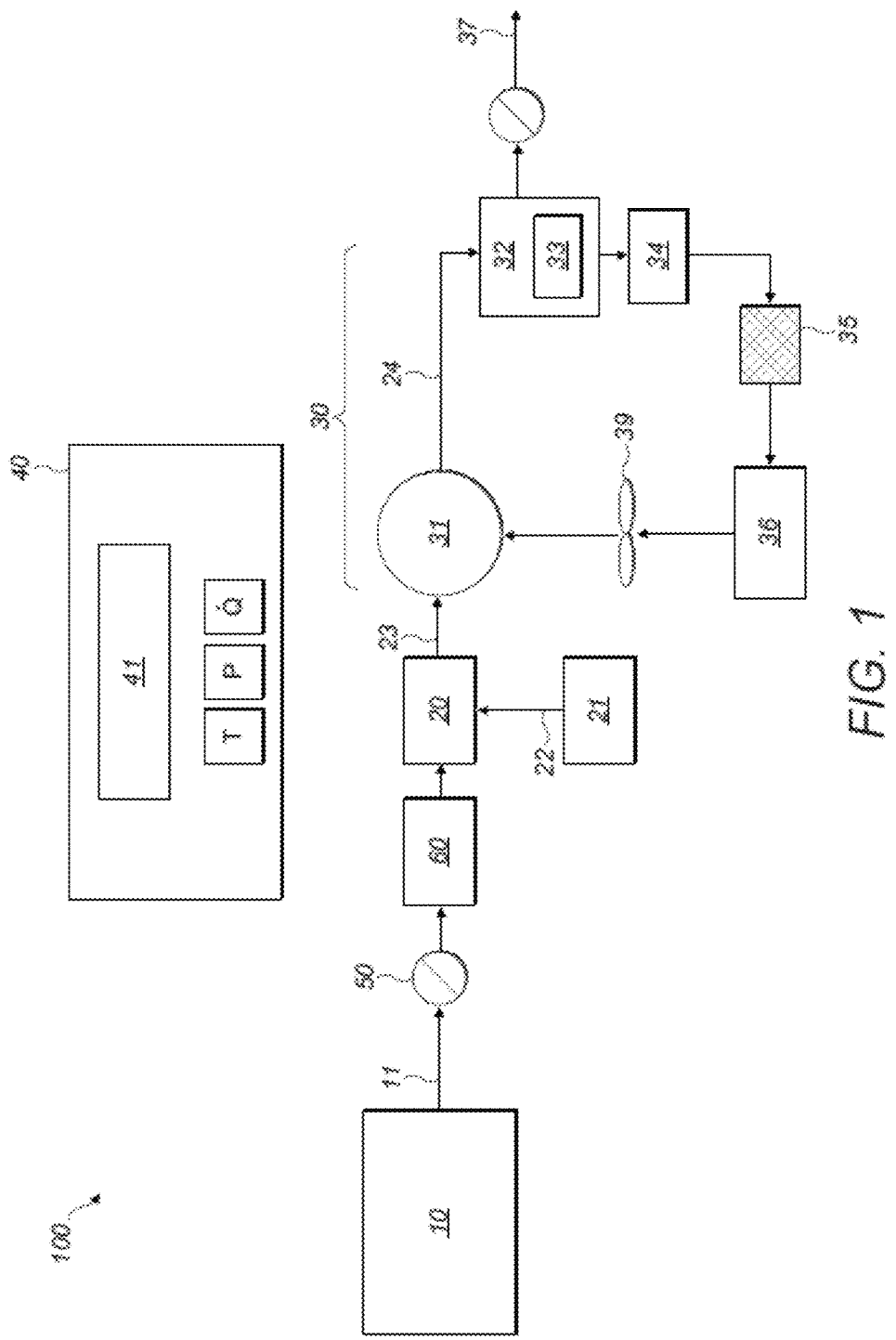
FIG. 1 shows an adaptive environmental conditioning system (aECS)

Aircraft ECSs provide air to cabin occupants at a proper temperature, pressure and flow. In the example shown in FIG. 1, an aECS 100 may include an air source 10, such as a compressed air source for providing a fresh air flow, FAF, to a controlled environment 32, such as a cabin of the aircraft. This may receive air from an engine bleed, APU, as well as a ground air supply and may be compressed via a compressor such as an electric compressor. The aECS 100 depicted in FIG. 1 may further comprise an air conditioning pack 20, a distribution system 30, and a controller 40.

The controller 40 may control the aECS to reduce the amount of Fresh Air Flow 11, also called external flow, based on certain conditions, described below. A reduction of the amount of Fresh Air Flow 11 that is drawn into the controlled environment may reduce engine energy consumption. This is because fuel burn consumption is required to compress the external air that is drawn into the aircraft. Therefore, the less external air drawn in, the less fuel the engine must use to compress the air.

The air source can be pneumatic or electric. In the case of a pneumatic air source, depending on the mission status, the air in a pneumatic (bleed) ECS is compressed by the engine compressor, an APU, or provided from ground services when the aircraft is on the ground. Energy is required to compress the outside air that enters the compressor stages of the engine core and some of this air is then extracted as bleed air. Bleed air extraction has a negative effect on engine performance, as it reduces the amount of air flow available to create thrust.

In the case of an electric aECS, this may take air directly from the atmosphere and compress it using an electric compressor, driven by power that is extracted from the engine (e.g. a gas turbine engine of an aircraft). The amount of compressed air may be controlled by one or more actuated flow control valves 50, such as that shown in FIG. 1. After the air has been compressed by the engine or by the electric compressor, it may be provided as Fresh Air Flow (flow 11) to the flow control valve 50 and from there to air quality (AQ) sensors 60 and then enter the air-conditioning packs 20. From this point on, the architectures of the two systems, pneumatic and electric, are very similar.

The air-conditioning pack 20 may be an air cycle refrigeration system that uses the external cold air (often called Ram air 22) as a refrigerant. The air conditioning is made possible by a combined turbine and compressor, valves for temperature and flow control, and heat exchangers (not shown) that, through the ram circuit 21, reduce the compressed ventilation air temperature. In this way, the air-conditioning pack 20 may provide air to the cabin at the proper temperature, flow rate, and pressure.

Different types of air conditioning pack 20 architectures exist; they can be mainly categorized based on the number of rotating machines. Examples include: two wheel bootstrap (compressor+turbine), three wheel bootstrap (fan+compressor+turbine) and four wheel bootstrap (fan+compressor+two turbines).

The aECS distribution system 30 may begin downstream of the air conditioning pack(s) 20. In this section of the system 100, the air-conditioned air 23, which has already flowed through the air-conditioning pack 20, may be mixed with the cabin recirculated air 24 in a mixing manifold or mixing chamber 31. Known ECSs typically combine outside air and recirculated air from the cabin in about equal amounts (i.e. 50% outside (ventilation) air 23, 50% recycled air 24). As described in detail below, this ratio may be adjusted in accordance with the present disclosure. The air being recirculated from the controlled environment 32 may be driven to the mixing chamber by a fan 39. The air from the controlled environment may, after any detection of an environmental property of the air (e.g. $CO_2$, other volatile contaminants), be driven through a gas filtration system 36 before reaching the mixing chamber 31.

The air mixed in the mixing chamber 31 then enter the controlled environment 32, (e.g. an aircraft cabin). Additional optional components 33 may be installed in the distribution system such as additional coolers, heaters and air driers.

As can be seen in FIG. 1, air may be circulated from the mixing chamber 31 to the controlled environment 32. This air is a mixture of the Fresh Air Flow and the recirculated air from the controlled environment 32. This air may pass through air quality (AQ) sensors 34, HEPA filters 35, as well as gas and particulate filters, e.g. carbon dioxide ($CO_2$) and Volatile Organic Carbon (VOC) filters before being reintroduced into the mixing chamber 31. Outboard air 37 may also be released from the controlled environment 32.

The aECS 100 according to the present disclosure is able to adapt the Fresh Air Flow 11 in order to optimize the function of various system components to reduce the overall system energy consumption without compromising the cabin air quality level. The present controller and method may also be added to a system that is currently a (non-adaptive) ECS, provided there is some means for controlling the FAF in that ECS, e.g. a flow control valve that could, in principle, be controlled by controller 40. That is, the controller 40 and sensor 34 may be retrofit onto an existing non-adaptive ECS to provide control of FAF in that ECS. The other features that described above in relation to the aECS 100, such as the gas filters, particulate filters, and air quality sensors are all optional features that may not be present in, for example, a retrofit ECS that uses a controller and sensor according to the present disclosure.

The aECS according to the present disclosure may be configured so as to (i) maintain the contaminants' concentration below threshold limits and therefore ensure a proper level of cabin air quality and passenger comfort, and (ii) reduce the fuel burn consumption associated with the aECS.

A reduced air flow could negatively impact the quality of air within the cabin, if it is not properly controlled. In particular, FAA regulations require a given amount of Fresh Air Flow per person in the aircraft of 0.25 kg/min/occupant.

The aECS 100 described herein may comprise a controller 40 that is configured to control a Flow Control Valve (FCV) 50 that regulates the external air flow 11 (i.e. regulated Fresh Air Flow) based on an estimated number occupants in the controlled environment, e.g. a number of passengers and crew aboard an aircraft. The controller 40 receives data from one or more sensors 34 (described in detail below) that sense a predetermined property of the controlled environment 32.

The components shown in FIG. 1 may be positioned at various points throughout the ECS 100. For example, some additional components may be present within the controlled environment 32 as shown in FIG. 1; however they might alternatively be located somewhere else. Similarly, the air quality components may additionally sense contaminants in, and/or air characteristics of, the fresh air flow 11.

The controller 40 of the new aECS 100 described herein may comprise a processor 41 and is configured to receive data from one or more sensors 34 and to estimate a number of people in the controlled environment 32 based on the sensor data. The flow control valve 50 may then be adjusted by the controller 40 (or based on information from the controller 40 provided to another aircraft system) to provide a particular air flow (Fresh Air Flow) 11 to the controlled environment 32 based on the estimated number of people in the controlled environment 32.

In one example, the one or more sensors 34 are for detecting an environmental property inside the controlled environment 32. For example, the sensors may comprise one or more of: carbon dioxide ($CO_2$) sensors, humidity sensors, or temperature sensors. In FIG. 1, the one or more sensors 34 are schematically depicted as being located in an air path outside the controlled environment 32 (e.g. air duct connected to the controlled environment 32). However, the one or more sensors 34 may be located inside the controlled environment 32. Further, in some examples, some sensors 34 may be located outside the controlled environment 32 (e.g. in an air path) while some other sensors 34 may be located inside the controlled environment 32. The values of temperature, humidity, and/or $CO_2$ concentration from the one or more sensors 34 may be passed to the controller 40. The controller may be configured to convert the sensor value(s) into an estimated number of occupants in the controlled environment 40. The controller 40 may estimate the number of people based on instantaneous sensor values and/or the controller 40 may collate sensor data over time (e.g. to measure a rate of change) and base the estimate of the number of people on the sensor data over time.

The sensor data may be converted to an estimated number of people in the controlled environment by any suitable mathematical model. Suitable models include, inter alia, probabilistic graphical models, steady state $CO_2$ concentrations, theoretical $CO_2$ mass balance, neural networks or hidden Markov models.

Humans will produce heat and give off water vapour and carbon dioxide. The one or more sensors 34 may measure these properties in the air coming from the controlled environment 32.

The controller 40 may be configured for a particular controlled environment 32, e.g. an aircraft cabin of known dimensions, and with known insulation parameters, and known (possibly controllable) outflow of outboard air 37. That is, the mathematical model used for converting sensor data into an estimated number of people in the controlled environment will typically include information related to the controlled environment itself, such as size, shape, energy inflows/outflows etc. In such a known controlled environment 32, each occupant will output an amount of heat, humidity and $CO_2$. These outputs may vary depending on the activity of each occupant, e.g. sleeping, sitting while awake, or eating.

During certain phases of flight, all, or nearly-all, occupants in the controlled environment will be undertaking the same activity. For example, during take-off, all occupants will typically be sitting awake in their seats. After a meal has been served by the cabin crew, most occupants will be eating. Therefore, during certain phases of flight, most occupants will be undertaking the same activity and therefore knowledge of the outputs of an "average occupant" (i.e. $CO_2$ output, heat output, humidity output) may be used to estimate the number of occupants from the sensor data. That is, in certain phases of flight, the variability range of, e.g. $CO_2$ output, will be minimised, allowing for more accurate estimation of the number of occupants.

The estimation step can theoretically be performed during any flight phase. Performing it at the beginning of the flight allows the ECS to have information on the estimated passenger numbers available as soon as possible.

In the example shown in FIG. 1, the controller 40 controls three environmental properties, T, P, and Q, representing cabin temperature and pressure and current mass-flow of Fresh Air Flow (i.e. flow through the valve 50), respectively. Cabin temperature and pressure sensors data may be used to determine whether the Fresh Air Flow 11 to the controlled environment 32 should be increased, decreased or maintained. Additionally, an aECS might comprise and cabin air quality controller, not depicted in FIG. 1 to control the contaminants concentration level within the controlled environment.

The controller 40 may be further configured to take into account an aircraft operating condition, such as a flight segment and/or duration.

A plurality of sensors 34 may be provided. The number, type and location of those sensors 34 will depend on the estimation method implemented in the controller 40. Generally, a larger number of sensors will lead to higher accuracy in the estimation of the number of passengers. Further, the controller may combine data from a plurality of different sensor types, i.e. sensors detecting different predetermined properties of the controlled environment 32, to increase the estimation accuracy. For example, the controller 40 may combine two or more estimates of the number of occupants, wherein each estimate is based on a different measured parameter (e.g. $CO_2$ and temperature, or $CO_2$ and pressure-sensor data, or light-level data and humidity data etc.) of the controlled environment. By combining the two estimates, the controller 40 may derive a single number for the estimated number of occupants and may control the fresh air flow 11 based at least in part on the single number. The single number may, for example, be an arithmetic average of the different estimates, a weighted-average of the different estimates (e.g. weighted based on the estimated errors of the different measurements), or may be the largest of the different estimates.

If a plurality of sensors 34 are installed along the cabin (controlled environment 32), the controller 40 may be configured to estimate the passenger density in different zones within the cabin. Such information can be used to control the fresh air flow 11 and recirculation flows within the different zones based on the occupant density in each zone.

Other sensor 34 types include, but are not limited to: an energy consumption sensor detecting electrical energy consumption in the controlled environment 32; a light sensor for detecting light levels in the controlled environment 32; a movement sensor for detecting movement of people within the controlled environment; a pressure sensor for detecting pressure in a seat in the controlled environment (which may detect either or both of the weight of a seated passenger and/or a heartbeat of an occupant of the seat); a microphone for detecting a sound level in the controlled environment; a camera for detecting a number of people in the controlled environment, a microprocessor detecting a number of smart phones of wearable devices connected to a network. Depending on the sensor 34 data type or types, an appropriate mathematical model may be chosen for estimating the number of people inside the controlled environment 32.

Figure 2:
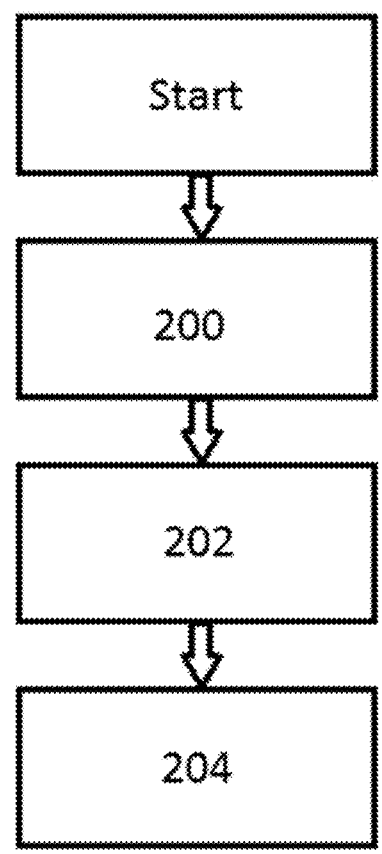
FIG. 2 shows a flow chart of the method of controlling fresh air flow.

FIG. 2 shows a flow chart of the disclosed method. At step 200, the one or more sensors 34 are used to measure a predetermined property of the controlled environment 32. At step 202, the controller 40 estimates the number of people in the predetermined environment 32 or within the single zones based on the measured property. At step 204, the controller controls a rate of fresh air flow 11 to the controlled environment 32 based at least in part on the estimated number of people in the controlled environment 32. The controller 204 may include further criteria in determining what fresh air flow 11 to provide, including, but not limited to, an amount of power available from an aircraft engine and a phase of flight of an aircraft.

The invention claimed is:

1. A method of controlling fresh air flow into a controlled environment, the method comprising:
 measuring, using a plurality of sensors, a respective predetermined property in the controlled environment; wherein each sensor is configured to sense a different property in the controlled environment;
 estimating, by a controller, a single number for a number of people inside the controlled environment based on combining estimates of the number of people inside the controlled environment derived from each of the plurality of measured properties, and
 setting, by the controller, a rate of fresh air flow to the controlled environment based at least in part on the estimated single number of people inside the controlled environment.

2. The method of claim 1, wherein the step of measuring comprises measuring an environmental property of the air in the controlled environment.

3. The method of claim 2, wherein the step of measuring the environmental property in the controlled environment comprises measuring a temperature, a carbon dioxide level, or a humidity level inside the controlled environment.

4. The method of claim 2, wherein the step of measuring the predetermined property in the controlled environment comprises measuring a rate of change of a temperature, a rate of change of a carbon dioxide level, or a rate of change of a humidity level inside the controlled environment.

5. The method of claim 1, wherein the plurality of sensors are configured to detect at least one of: energy consumption in the controlled environment, light levels in the controlled environment, movement of people within the controlled environment, pressure in at least a plurality of seats in the controlled environment, a sound level within the controlled environment, or the sensor is a camera or a microprocessor detecting personal devices connected to a network.

6. The method of claim 1, wherein the controlled environment is an aircraft cabin.

7. The method according to claim 1, wherein the controlled environment is an aircraft cabin, and the step of measuring is performed between take-off and cruise of the aircraft.

8. The method of claim 1, wherein the controlled environment is divided into a plurality of zones and the method further comprises:
 estimating, by the controller, the number of people in each zone of the controlled environment based on the measured properties, and
 setting, by the controller, a proper ratio of fresh and recirculated air flow to each zone of the controlled environment based at least in part on the estimated number of people inside that zone of the controlled environment.

9. A system for controlling fresh air flow into a controlled environment, the system comprising:
 a controller configured to control a valve for allowing fresh air into the controlled environment; and
 a plurality of sensors, each configured for detecting a different predetermined property inside the controlled environment, wherein the controller is connected to the plurality of sensors and is configured to:
 determine, using data received from each of the plurality of sensors, a respective predetermined property in the controlled environment;
 estimate a single number for a number of people inside the controlled environment based on combining estimates of the number of people inside the controlled environment derived from each of the plurality of measured properties; and to
 control the valve to allow a given flow of fresh air into the controlled environment wherein an amount of the flow of fresh air is based at least in part on the estimated single number of people inside the controlled environment.

10. The system of claim 9, wherein at least one of the plurality of sensors is configured to measure temperature, carbon.

11. The system of claim 9, wherein the plurality of sensors includes at least one of: an energy consumption sensor detecting electrical energy consumption in the controlled environment, a light sensor for detecting levels in the controlled environment, a movement sensor for detecting movement of people within the controlled environment, a pressure sensor for detecting pressure in a seat in the controlled environment, a microphone for detecting a sound level in the controlled environment, a camera for detecting a number of people in the controlled environment, or a microprocessor to detect personal devices connected to a network.

12. The system of claim 9, wherein the plurality of sensors are connected to the controller via a wireless connection.

13. An aircraft comprising:
 the system of claim 9; wherein the at least one sensor is located in the controlled environment, the controlled environment being an aircraft cabin.

14. The aircraft of claim 13, wherein the fresh air flow comes from an engine of the aircraft, an electric compressor of the aircraft, an Auxiliary Power Unit of the aircraft or a ground air supply.

15. The system of claim 9, wherein the controller is configured to determine a rate of change of at least one of the predetermined properties, and to estimate the number of people inside the controlled environment based on the rate of change of at least one of the predetermined properties.

\* \* \* \* \*